United States Patent
Gärdenfors et al.

(10) Patent No.: US 10,410,605 B2
(45) Date of Patent: Sep. 10, 2019

(54) SYSTEM AND METHOD FOR DETERMINING A DISPLAY ORIENTATION OF A MOBILE DEVICE

(75) Inventors: Dan Zacharias Gärdenfors, Malmö (SE); Nazih Almalki, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 548 days.

(21) Appl. No.: 13/544,517

(22) Filed: Jul. 9, 2012

(65) Prior Publication Data
US 2014/0009499 A1    Jan. 9, 2014

(51) Int. Cl.
| | |
|---|---|
| G09G 5/36 | (2006.01) |
| G06F 3/0488 | (2013.01) |
| G06F 1/16 | (2006.01) |

(52) U.S. Cl.
CPC .......... *G09G 5/363* (2013.01); *G06F 1/1626* (2013.01); *G06F 1/1643* (2013.01); *G06F 1/1647* (2013.01); *G06F 1/1677* (2013.01); *G06F 3/0488* (2013.01); *G06F 2200/1614* (2013.01); *G06F 2200/1637* (2013.01); *G09G 2340/0492* (2013.01); *G09G 2380/16* (2013.01)

(58) Field of Classification Search
CPC .... G06F 1/1601; G06F 3/1438; G06F 1/1626; G06F 1/3203; G06F 3/0482; G06F 3/04883; G06F 2200/1614; G06F 1/1694; G06F 2200/1637; G06F 3/012; G07F 17/32; G07F 17/3232; A63F 1/18; A63F 2009/2454; H04L 12/282; H04L 2012/2841; H04L 9/3226; G02B 27/017; G06T 5/002; G06T 7/337; G06T 7/74; H04W 88/02

USPC ........................................................ 345/656
See application file for complete search history.

(56) References Cited

U.S. PATENT DOCUMENTS

| | | | |
|---|---|---|---|
| 8,717,285 B1* | 5/2014 | White | G06F 3/0346 345/156 |
| 2009/0002391 A1* | 1/2009 | Williamson et al. | 345/619 |
| 2009/0262074 A1 | 10/2009 | Nasiri et al. | |
| 2009/0300537 A1 | 12/2009 | Park | |
| 2010/0060664 A1 | 3/2010 | Kilpatrick, II et al. | |
| 2010/0188503 A1 | 7/2010 | Tsai et al. | |
| 2010/0323762 A1 | 12/2010 | Sindhu | |

(Continued)

FOREIGN PATENT DOCUMENTS

| | | |
|---|---|---|
| JP | 3090450 U | 12/2002 |
| WO | 2005027550 A1 | 3/2005 |

OTHER PUBLICATIONS

Canadian Office Action dated Feb. 13, 2015, received for Canadian Application No. 2,820,289.

(Continued)

*Primary Examiner* — Ryan M Gray
(74) *Attorney, Agent, or Firm* — Jose Gutman; Fleit Gibbons Gutman Bongini & Bianco, P.L.

(57) ABSTRACT

A method and system are provided for determining a display orientation of a mobile device. The mobile device is configured to change the display orientation when an orientation of the mobile device satisfies one or more criteria. The method includes determining the orientation of the mobile device and providing an indicator of a proximity of the orientation of the mobile device to satisfying the one or more criteria.

18 Claims, 15 Drawing Sheets

(56) References Cited

U.S. PATENT DOCUMENTS

| | | | | |
|---|---|---|---|---|
| 2011/0164056 | A1* | 7/2011 | Ording | G06F 1/1694 |
| | | | | 345/649 |
| 2012/0299964 | A1* | 11/2012 | Homma et al. | 345/649 |
| 2013/0038634 | A1* | 2/2013 | Yamada | G09G 5/00 |
| | | | | 345/649 |
| 2013/0328935 | A1* | 12/2013 | Tu | 345/651 |

OTHER PUBLICATIONS http://cdn.crackberry.com/files/u10880/screen-orientation.png; retrieved from the Internet on May 10, 2012, 1 page.

Trickyguy, TrickyWays, "How to Lock Screen Orientation on BlackBerry PlayBook,", http://www.trickyways.com/2011/04/how-to-lock-screen-orientation-on-blackberry-playbook/; available on the Internet as early as Apr. 24, 2011; retrieved from the Internet on May 10, 2012, 3 pages.

OSX Daily, "Lock the Screen Orientation on the iPad", http://osxdaily.com/2010/04/04lock-the-screen-orientation-on-the-ipad/; available on the Internet as early as Apr. 4, 2010; retrieved from the Internet on May 14, 2012, 2 pages.

Gesture Cube; "Introducing the Gesture Cube," http://www.youtube.com/watch?v=ieolCZBvKPQ; available on the Internet as early as Jan. 29, 2010; retrieved from the Internet Jun. 26, 2012, 2 pages.

European Patent Office, Extended European Search Report issued in corresponding EP Patent Application No. EP12175510.2, dated Oct. 9, 2012, 5 pages.

* cited by examiner

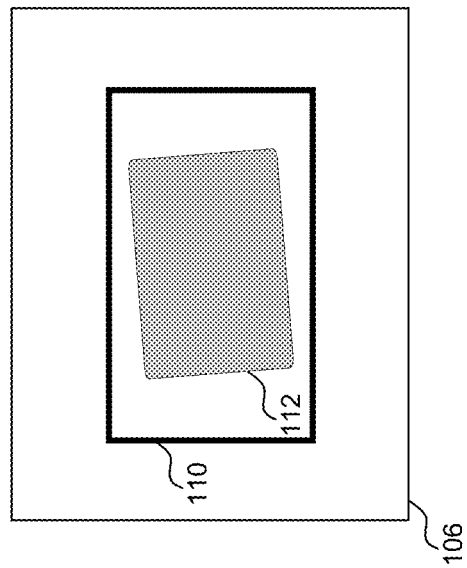
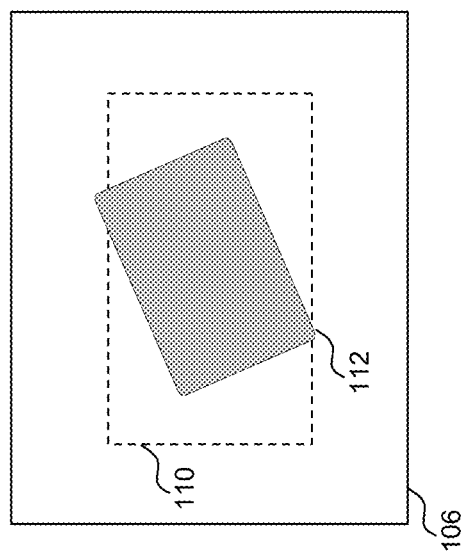
FIG. 2B

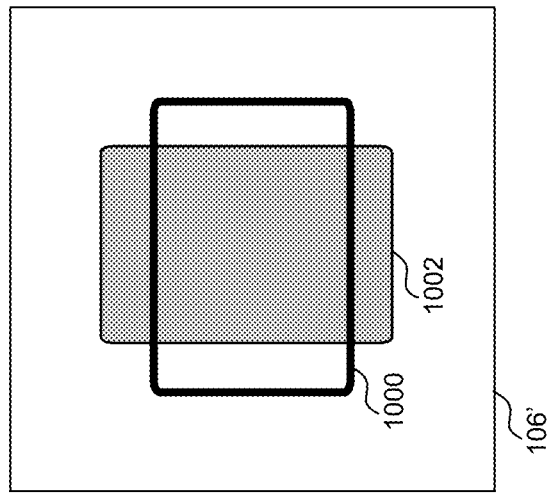
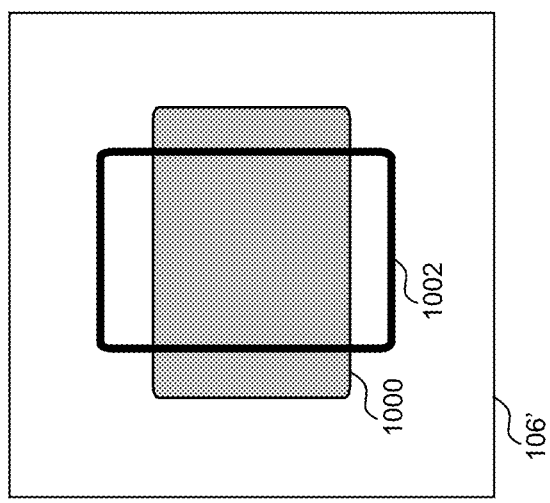
FIG. 10

SYSTEM AND METHOD FOR DETERMINING A DISPLAY ORIENTATION OF A MOBILE DEVICE

TECHNICAL FIELD

The following relates generally to determining a display orientation of a mobile device.

DESCRIPTION OF THE RELATED ART

Many electronic devices, including mobile devices, can be positioned in multiple orientations. More recently, mobile devices can change the display orientation (i.e. orientation of the screen shown on a display of a mobile device) in response to a change in the orientation of the mobile device. For example, a mobile device positioned in a portrait orientation may display content in a corresponding portrait orientation. When the mobile device is rotated, for example by 90° onto one side, the mobile device may automatically change the display orientation to a landscape orientation.

BRIEF DESCRIPTION OF THE DRAWINGS

Embodiments will now be described by way of example only with reference to the appended drawings wherein:

FIGS. 2A and 2B are diagrams of an example of an indicator corresponding to the orientations of the mobile device of FIGS. 1A and 1B.

FIG. 10 is a diagram of another example of an indicator corresponding to the orientations of the mobile device of FIGS. 1A and 1B.

DETAILED DESCRIPTION

Figure 1A:
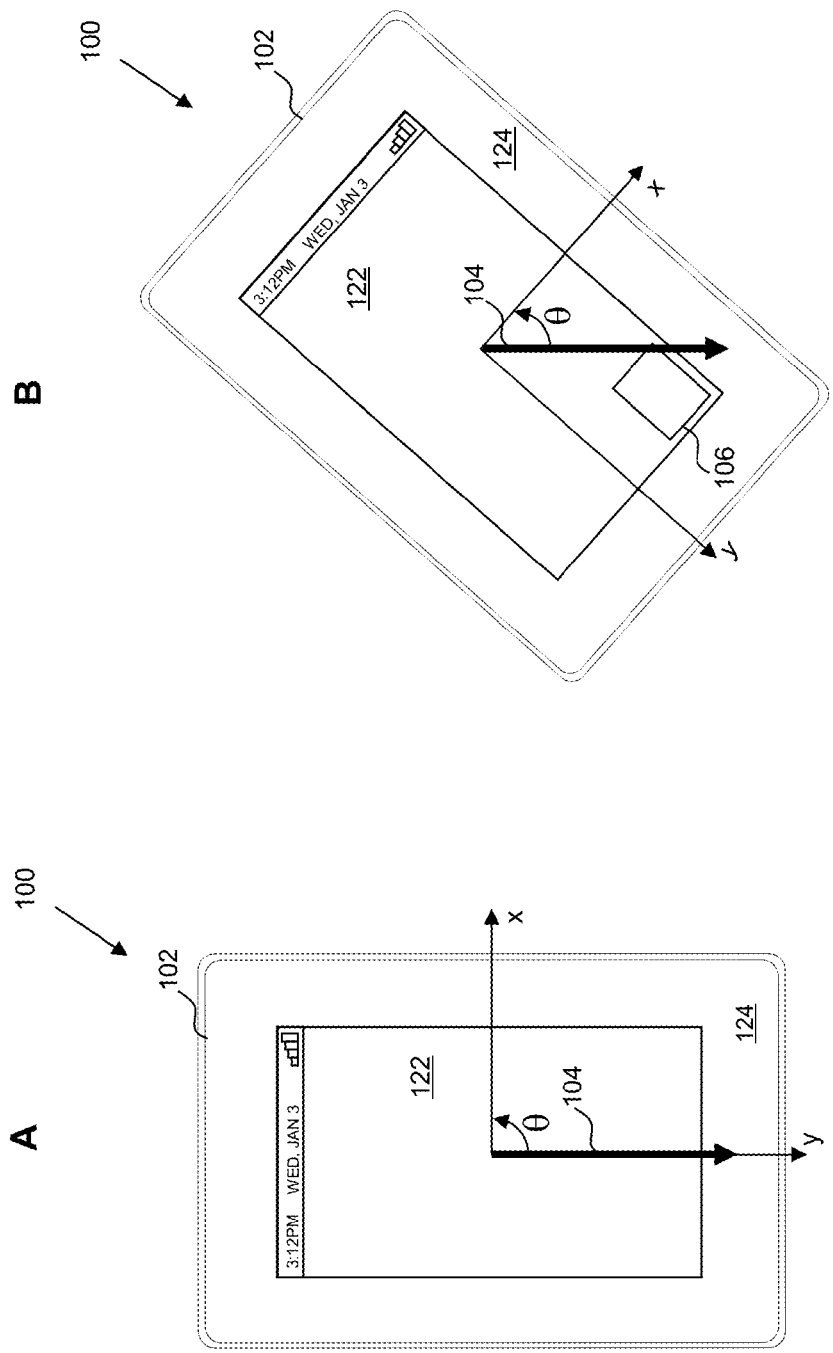
FIGS. 1A and 1B are plan views of an example of a mobile device in different orientations.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Electronic devices, including tablet computers and other mobile devices, may automatically change display orientations based on a detected orientation of the mobile device. For example, rotating a mobile device from a portrait orientation to a landscape orientation may cause the display orientation to change in a similar manner to maintain a particular orientation of the screen relative to a reference direction, such as the vertical direction of the Earth (e.g. gravity).

However, a mobile device may change the display orientation to an orientation that is more difficult to view by a user, especially if the user is lying down, inverted or otherwise not aligned with the reference direction used to change the display orientation. As a result, a user may not want the display orientation to change in certain circumstances, even if the mobile device has changed orientations.

Therefore, it has been recognized that methods of determining a display orientation on a mobile device may be limited. To address this, the following describes a method, computer readable storage medium and mobile device operable to determine a display orientation of the mobile device.

In one aspect there is provided a method of determining a display orientation of a mobile device. The mobile device is configured to change the display orientation when an orientation of the mobile device satisfies one or more criteria. The method includes determining the orientation of the mobile device and providing an indicator of a proximity of the orientation of the mobile device to satisfying the one or more criteria.

In another aspect, there is provided a computer readable storage medium for determining a display orientation of a mobile device. The mobile device is configured to change the display orientation when an orientation of the mobile device satisfies one or more criteria. The computer readable storage medium includes computer executable instructions for determining the orientation of the mobile device and providing an indicator of a proximity of the orientation of the mobile device to satisfying the one or more criteria.

In another aspect, there is provided a mobile device that includes a processor and memory. The mobile device is configured to change the display orientation when an orientation of the mobile device satisfies one or more criteria. The memory stores computer executable instructions for determining the orientation of the mobile device and providing an indicator of a proximity of the orientation of the mobile device to satisfying the one or more criteria.

Figure 1B:
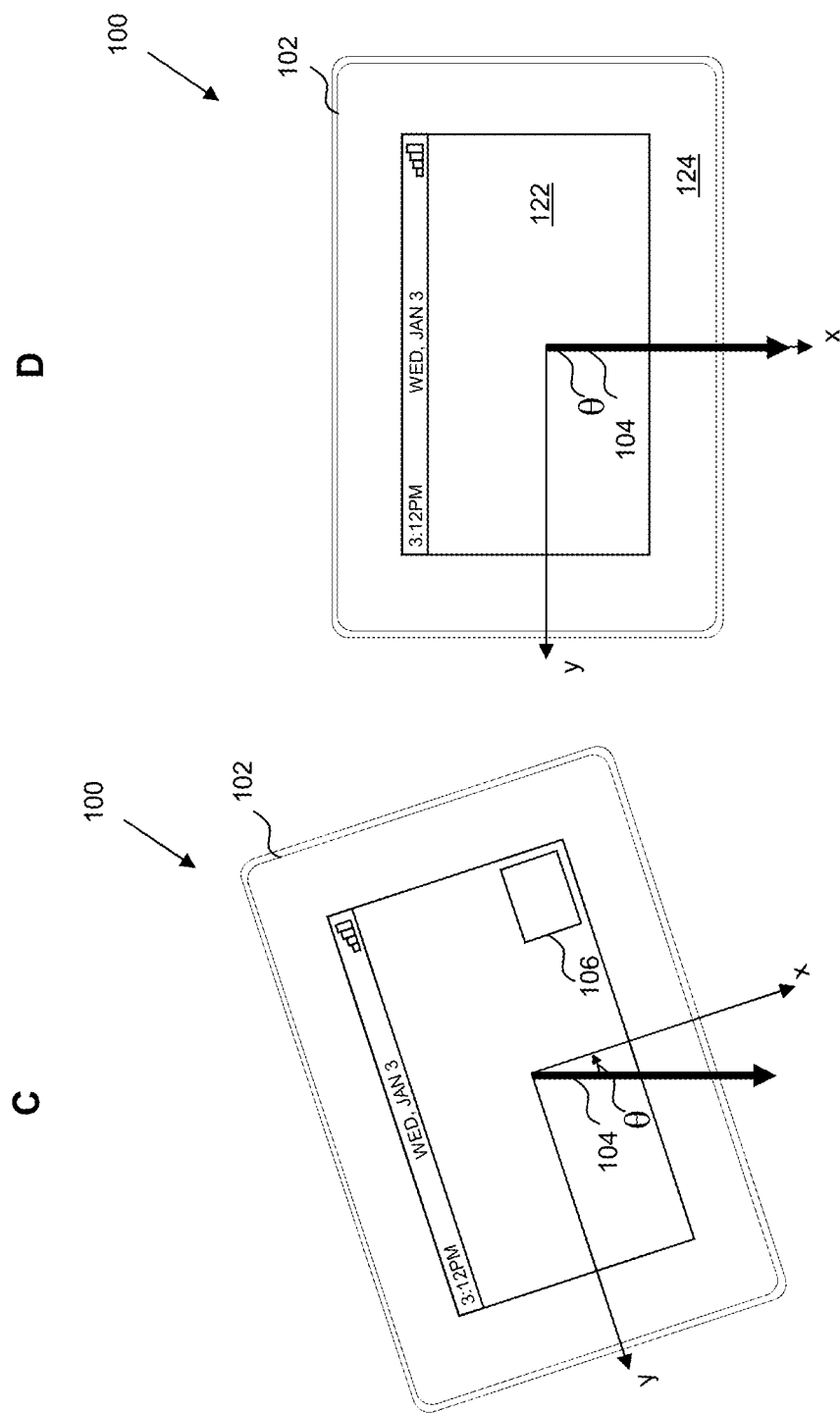

Referring to FIGS. 1A and 1B, plan views of an example embodiment of an electronic device, such as a mobile device 100, moving from a portrait orientation to a landscape orientation is shown. In this example, the mobile device 100 includes a touch-sensitive display 102. The touch-sensitive display 102 may include a touch-sensitive non-display area 124 surrounding a touch-sensitive display area 122, both of which may be capable of receiving inputs in the form of touch gestures. In other example embodiments, the mobile device 100 may include a non touch-sensitive display in addition to, or in replacement of, the touch-sensitive display 102.

The mobile device 100 has a frame of reference, such as the xyz axes of the Cartesian co-ordinate system. In this example, the x axis is parallel to the length of the mobile device 100, the y axis is parallel to the width of the mobile device 100 and the z axis is perpendicular to the plane defined by the touch-sensitive display 102 (not shown as it points into the page). As the mobile device 100 changes orientation, the x, y and z axes remain fixed with respect to the mobile device 100.

In the example of FIGS. 1A and 1B, the mobile device 100 rotates clockwise from a portrait orientation at position A, through intermediate positions B and C, to a landscape orientation at position D. The orientation of the mobile device 100 can be determined with respect to a frame of reference, such as the Earth's frame of reference. In one example, the mobile device 100 can detect its orientation by determining the angle θ between a fixed reference direction 104, such as the Earth's gravity, and the x axis of the mobile device 100

At position A, both the mobile device 100 and the touch-sensitive display area 122 are orientated in the portrait orientation. The mobile device 100 can detect the portrait orientation of the mobile device 100 by obtaining the gravity reference direction 104 (e.g. from an accelerometer) and checking that the gravity reference direction 104 is substantially parallel to the xy plane and at an angle θ of approximately 90 degrees to the x axis.

The mobile device 100 is rotated clockwise from position A to position B. The display orientation is maintained in the portrait orientation. The mobile device can detect the change in orientation of the mobile device 100 by determining the angle θ. The reduction in the angle θ can indicate that the mobile device 100 is being rotated towards a landscape orientation.

The mobile device 100 may also be configured to change the display orientation when the orientation of the mobile device 100 approaches a landscape orientation. For example, the mobile device 100 may change the display orientation to a landscape orientation when the angle θ is below a certain value, such as 30 degrees. In this example, moving the mobile device 100 from position B to position C changes the display orientation of the touch-sensitive display area 122 from a portrait orientation to a landscape orientation.

From position C to position D, the mobile device 100 continues to rotate clockwise until the mobile device 100 is in the landscape orientation, as detected by determining an angle θ close to 0 degrees. At position D, both the orientation of the mobile device 100 and the display orientation are in the landscape orientation.

The mobile device 100 can display an indicator 106 to indicate to a user that the mobile device 100 is approaching an orientation which will trigger the display orientation to change if the motion of the mobile device 100 is maintained (position B of FIG. 1A). The indicator 106 can provide an opportunity for the user to determine whether to continue the motion to trigger the display orientation to change, or stop or reverse the motion of the mobile device 100 to avoid changing the display orientation.

For example, in position B, the mobile device 100 displays an indicator 106 as the angle θ decreases towards a threshold angle (e.g. 30 degrees) that triggers a display orientation change. After the display orientation has changed from portrait to landscape, the mobile device 100 may continue to display the indicator 106 as the mobile device 100 moves away, but is near the threshold angle (position C of FIG. 1B). In the example of FIGS. 1A and 1B, the indicator 106 is not displayed when the mobile device 100 is positioned such that the angle θ is not within a predetermined amount from the threshold angle (e.g. positions A and D). In another example embodiment, the indicator 106 can be permanently displayed, and the content of the indicator 106 can indicate the proximity of the current orientation of the mobile device 100 to an orientation that can trigger a display orientation change.

Figure 2A:
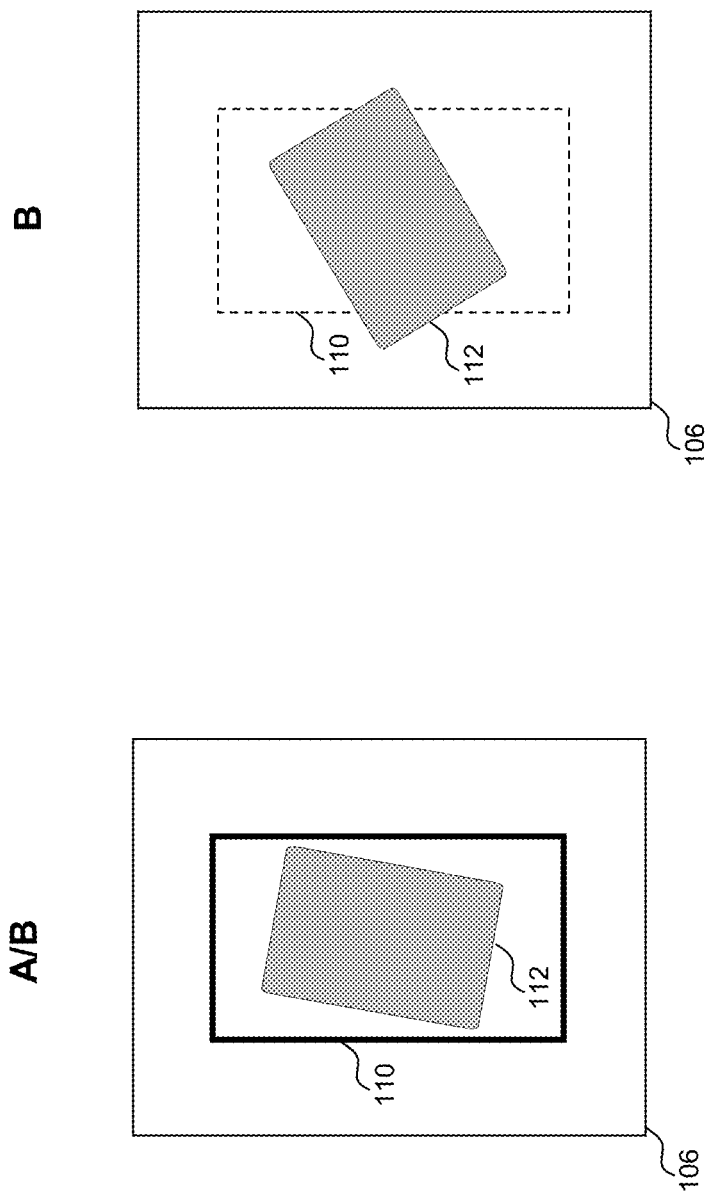

An example indicator 106 is shown in FIGS. 2A and 2B corresponding to the orientations of the mobile device 100 of FIGS. 1A and 1B. In this example, the indicator 106 includes a display orientation indicator 110 to indicate the current display orientation (e.g. portrait or landscape). For example, the display orientation indicator 110 takes the shape of a portrait orientation for a position in between A and B (labelled in FIG. 2A as "A/B") and position B and a landscape orientation for a position in between C and D (labelled in FIG. 2B as "C/D") and position D.

The display orientation indicator 110 can also indicate the proximity of the current orientation of the mobile device 100 to an orientation that can trigger a change in the display orientation. When the current orientation is farther away from an orientation that can trigger a display orientation change, the border of the display orientation indicator 110 can be stronger and when the current orientation is closer to an orientation that can trigger a display orientation change, the border of the display orientation indicator 110 can be weaker to indicate that the current display orientation may change. For example, the border of the display orientation indicator 110 is stronger at position A/B than at position B (FIG. 2A), and stronger at position C/D than at position C (FIG. 2B).

In the example of FIGS. 2A and 2B, the indicator 106 also includes a device orientation indicator 112, indicating the orientation of the mobile device 100 with respect to a fixed frame of reference, such as the Earth.

It can therefore be seen that a mobile device 100 can be configured to provide an indicator to notify a user that the orientation of the mobile device 100 is approaching an orientation that will cause the mobile device 100 to change the display orientation.

Examples of applicable mobile electronic devices may include, without limitation, cellular phones, smart-phones, tablet computers, wireless organizers, personal digital assistants, computers, laptops, handheld wireless communication devices, wirelessly enabled notebook computers, portable gaming devices, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, wall-mounted screens such as kiosks, or any other computing device.

The mobile device 100 may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 3:
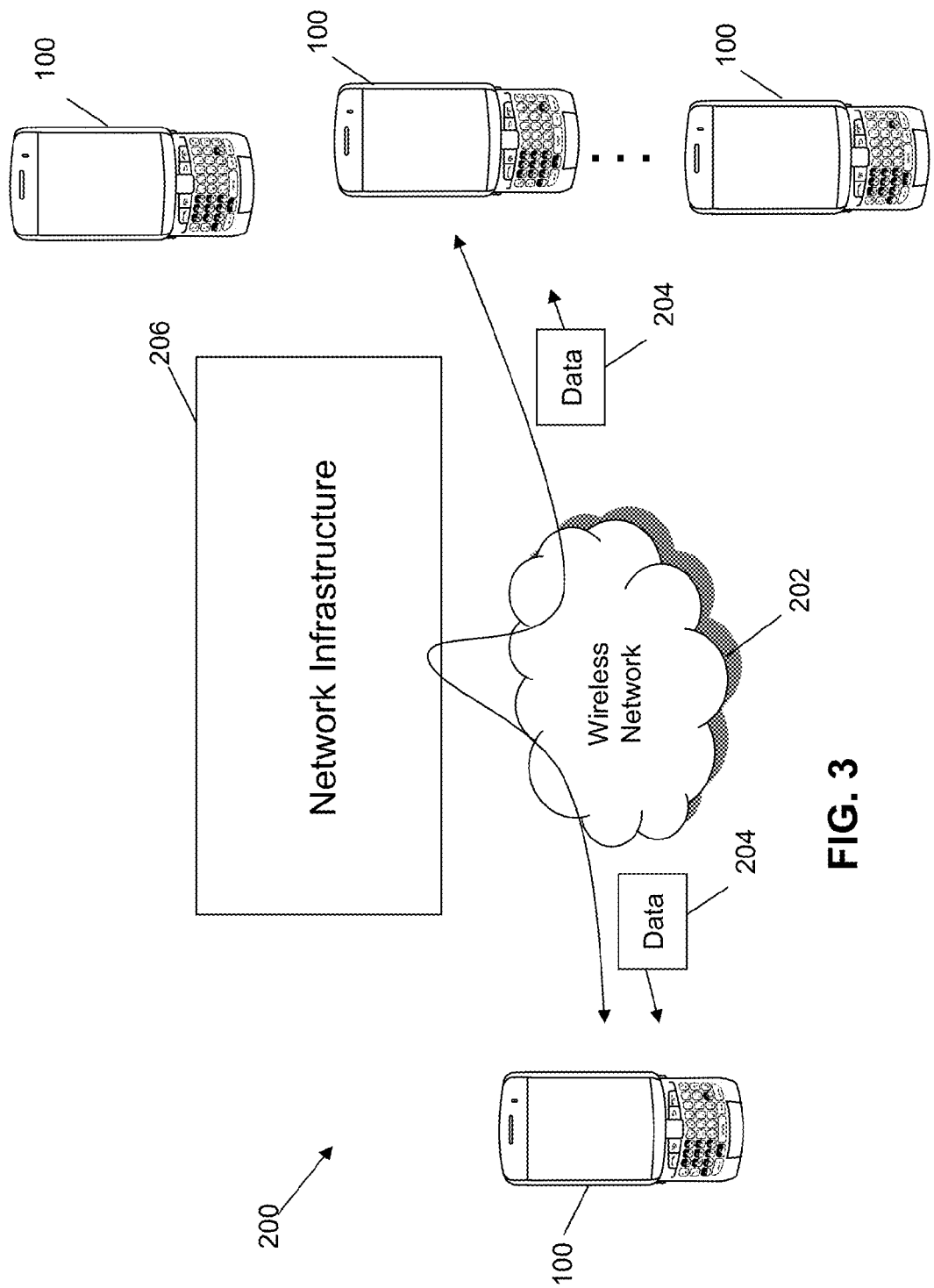
FIG. 3 is a diagram of an example of a wireless communication system.

Referring to FIG. 3, an example communication system 200 is shown. The communication system 200, in this example, enables, at least in part, mobile devices 100 to communicate with each other via a wireless network 202. For example, as shown, data 204 may be exchanged between various mobile devices 100. Data 204 that is sent from one mobile device 100 to another mobile device 100 may be transmitted according to a particular messaging or communication medium, protocol, or other mechanism. For example, as shown in FIG. 3, data 204 may be sent over the wireless network 202 via a component of a network infrastructure 206. The network infrastructure 206 can include various systems that may be used by the mobile devices 100 to exchange data 204. For example, a peer-to-peer (P2P) system, a short message service centre (SMSC), an email system (e.g. web-based, enterprise based, or otherwise), a web system (e.g. hosting a website or web service), a host system (e.g. enterprise server), and social networking system may be provided by or within or be otherwise supported or facilitated by the network infrastructure 206. The mobile devices 100 may therefore send data to or receive data from other mobile devices 100 via one or more particular systems with which the mobile devices 100 are communicable via the wireless network 202 and network infrastructure 206.

Figure 4:
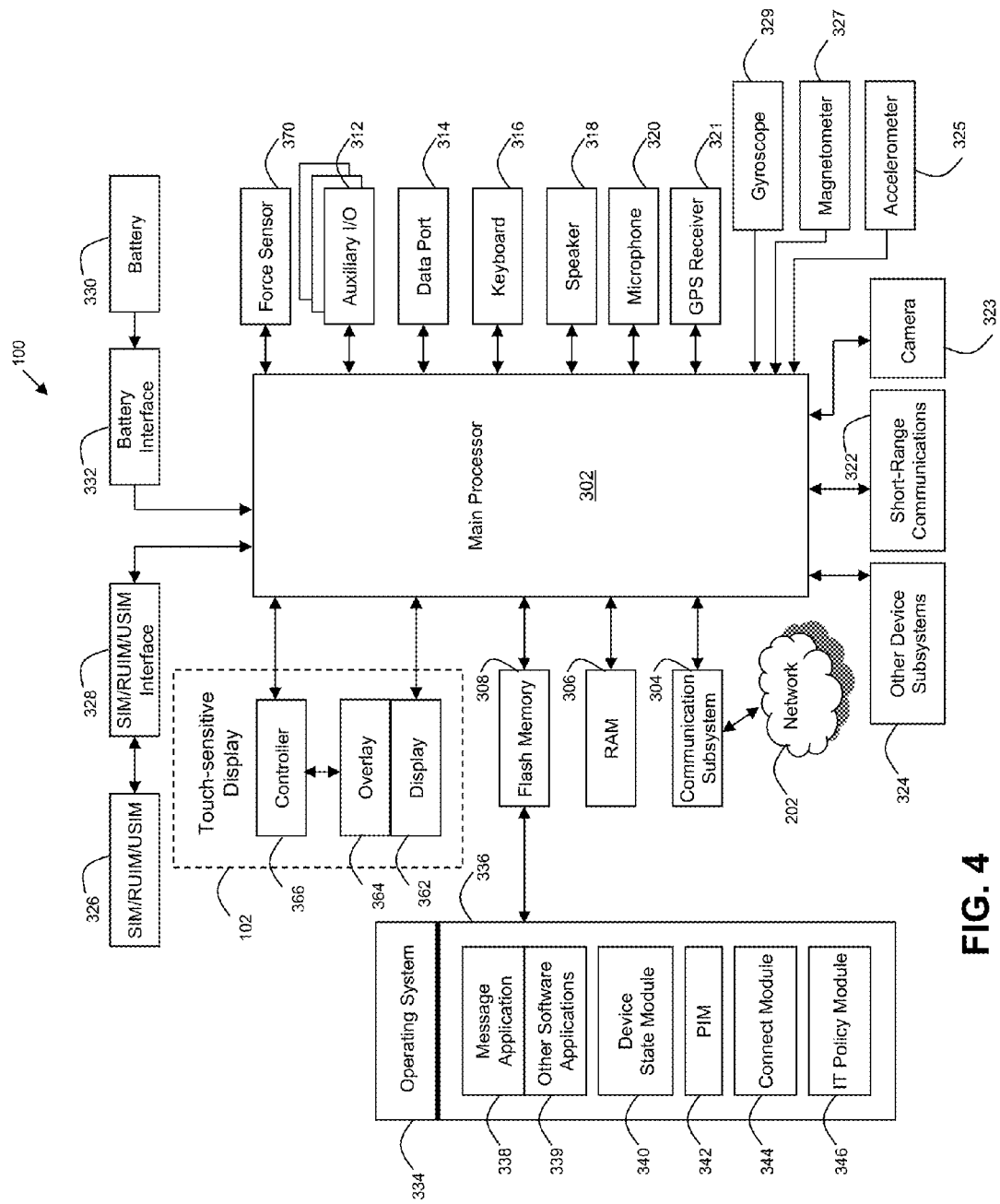
FIG. 4 is a diagram of an example of a mobile device.

To aid the reader in understanding an example configuration of a mobile device 100, reference will be made to FIG. 4, which illustrates a diagram of an example of a mobile device 100. The mobile device 100 includes a number of components such as a main processor 302 that controls the overall operation of the mobile device 100. Communication functions, including data and voice communications, are performed through a communication subsystem 304. The communication subsystem 304 receives messages from and sends messages to a wireless network 202. In this example of the mobile device 100, the communication subsystem 304 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the example described herein are intended to use any other suitable standards that are developed in the future. The wireless link connecting the communication subsystem 304 with the wireless network 202 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 102, an auxiliary input/output (I/O) subsystem 312, a data port 314, a keyboard 316, a speaker 318, a microphone 320, a GPS receiver 321, short-range communications 322, a camera 323, a accelerometer 325, a magnetometer 327, a gyroscope 329 and other device subsystems 324. Some of the subsystems of the mobile device 100 perform communication-related functions, whereas other subsystems may provide "resident" or on-device functions. By way of example, the display 102 and the keyboard 316 may be used for both communication-related functions, such as entering a text message for transmission over the network 202, and device-resident functions such as a calculator or task list. In one example, the mobile device 100 can include a non touch-sensitive display in place of, or in addition to the touch-sensitive display 102.

The mobile device 100 can send and receive communication signals over the wireless network 202 after required network registration or activation procedures have been completed. Network access is associated with a subscriber or user of the mobile device 100. To identify a subscriber, the mobile device 100 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network. Without the component 326, the mobile device 100 is not fully operational for communication with the wireless network 202. Once the SIM/RUIM/USIM 326 is inserted into the SIM/RUIM/USIM interface 328, it is coupled to the main processor 302.

The mobile device 100 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 100. Although current technology makes use of a battery, future technologies such as micro fuel cells may provide the power to the mobile device 100.

The mobile device 100 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 100 during its manufacture. Software applications may include a message application 338, a device state module 340, a Personal Information Manager (PIM) 342, a connect module 344 and an IT policy module 346. A message application 338 can be any suitable software program that allows a user of the mobile device 100 to send and receive electronic messages, wherein messages are typically stored in the flash memory 308 of the mobile device 100. A device state module 340 provides persistence, i.e. the device state module 340 ensures that important device data is stored in persistent memory, such as the flash memory 308, so that the data is not lost when the mobile device 100 is turned off or loses power. A PIM 342 includes functionality for organizing and managing data items of interest to the user, such as, but not limited to, e-mail, contacts, calendar events, and voice mails, and may interact with the wireless network 202. A connect module 344 implements the communication protocols that are required for the mobile device 100 to communicate with the wireless infrastructure and any host system, such as an enterprise system, that the mobile device 100 is authorized to interface with. An IT policy module 346 receives IT policy data that encodes the IT policy, and may be responsible for organizing and securing rules such as the "Set Maximum Password Attempts" IT policy.

Other types of software applications or components 339 can also be installed on the mobile device 100. These software applications 339 can be pre-installed applications (i.e. other than message application 338) or third party applications, which are added after the manufacture of the mobile device 100. Examples of third party applications include games, calculators, utilities, etc.

The additional applications 339 can be loaded onto the mobile device 100 through at least one of the wireless network 202, the auxiliary I/O subsystem 312, the data port 314, the short-range communications subsystem 322, or any other suitable device subsystem 324.

The data port 314 can be any suitable port that enables data communication between the mobile device 100 and another computing device. The data port 314 can be a serial or a parallel port. In some instances, the data port 314 can be a USB port that includes data lines for data transfer and a supply line that can provide a charging current to charge the battery 330 of the mobile device 100.

For voice communications, received signals are output to the speaker 318, and signals for transmission are generated by the microphone 320. Although voice or audio signal output is accomplished primarily through the speaker 318, the display 102 can also be used to provide additional information such as the identity of a calling party, duration of a voice call, or other voice call related information.

The touch-sensitive display 102 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 102 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 362 of the touch-sensitive display 102 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 102. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 102. The location of the touch moves as the detected object moves during a touch. The controller 366 and/or the processor 302 may detect a touch by any suitable contact member on the touch-sensitive display 102. Similarly, multiple simultaneous touches, are detected.

One or more gestures are also detected by the touch-sensitive display 102. A gesture is a particular type of touch on a touch-sensitive display 102 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 102 and a back of the mobile device 100 to detect a force imparted by a touch on the touch-sensitive display 102. The force sensor 370 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 5:
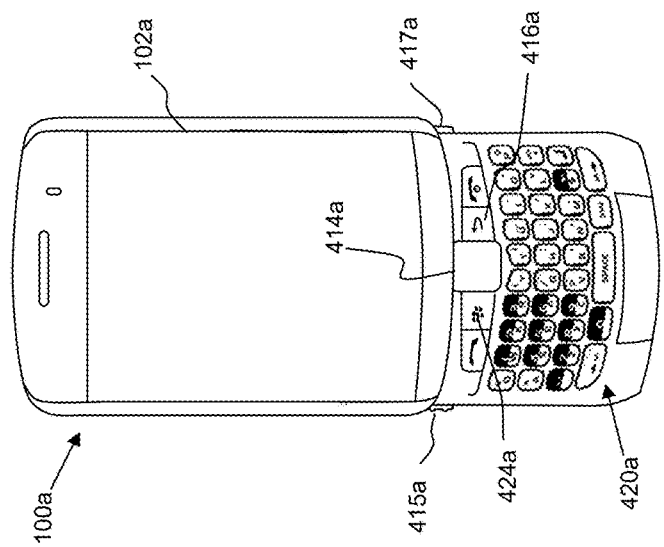
FIG. 5 is a plan view of an example of a mobile device.
Figure 6:
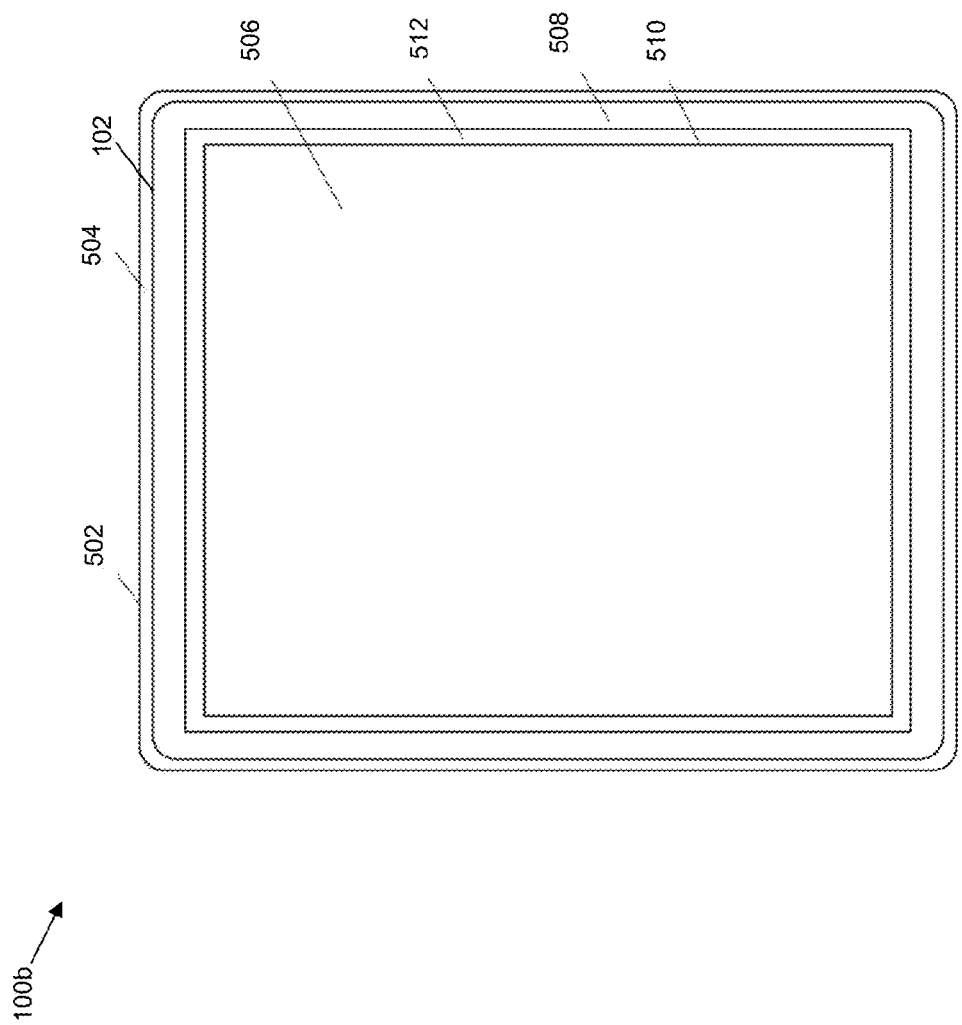
FIG. 6 is a plan view of another example of a mobile device.

Referring to FIGS. 5 and 6, one example of a mobile device 100a is shown in FIG. 5 and another example of a mobile device 100b is shown in FIG. 6. It will be appreciated that the numeral "100" will hereinafter refer to any mobile device 100, including the examples 100a and 100b, those examples enumerated above or otherwise. It will also be appreciated that a similar numbering convention may be used for other general features common between all figures.

The mobile device 100a shown in FIG. 5 includes a touch-sensitive display 102a and a cursor or positioning device, which in this example is in the form of a trackpad 414a. In this example, a touch-sensitive display area spans the entire touch-sensitive display 102a. The trackpad 414a permits multi-directional positioning of a selection indicator or cursor that can be displayed on the touch-sensitive display 102a such that the selection cursor can be moved in an upward, downward, left and right direction, and if desired and/or permitted, in any diagonal direction. A selection cursor may include a box, alteration of an icon or any combination of features that enable the user to identify the currently chosen icon or item. The trackpad 414a in this example is situated on the front face of a housing for mobile device 100a to enable a user to manoeuvre the trackpad 414a while holding the mobile device 100a in one hand. The trackpad 414a may serve as another input member (in addition to a directional or positioning member) to provide selection inputs to a processor of the mobile device and can preferably be pressed in a direction towards the housing of the mobile device 100a to provide such a selection input. It will be appreciated that the trackpad 414a is only one example of a suitable positioning device. For example, a trackball, touch-sensitive display, OLED, or other input mechanism may equally apply.

The mobile device 100a in FIG. 5 also includes a programmable convenience button 415a to activate a selection application such as, for example, a calendar or calculator. Further, mobile device 100a also includes an escape or cancel button 416a, a camera button 417a, a menu or option button 424a and a keyboard 420a. The camera button 417a is able to activate photo and video capturing functions, e.g. when pressed in a direction towards the housing. The menu or option button 424a can be used to load a menu or list of options on the display 102a when pressed. In this example, the escape or cancel button 416a, the menu option button 424a, and a keyboard 420a are disposed on the front face of the mobile device housing, while the convenience button 415a and camera button 417a are disposed at the side of the housing. This button placement enables a user to operate these buttons while holding the mobile device 100a in one hand. The keyboard 420a is, in this example, a standard QWERTY keyboard, however, it will be appreciated that reduced QWERTY or virtual keyboards (e.g. as provided by a touch-sensitive display) may equally apply.

It will be appreciated that for the mobile device 100, a wide range of one or more positioning or cursor/view positioning mechanisms such as a touch/track pad, a positioning wheel, a joystick button, a mouse, a touch-sensitive display, a set of arrow keys, a tablet, an accelerometer (for sensing orientation and/or movements of the mobile device 100 etc.), OLED, or other whether presently known or unknown may be employed. Similarly, any variation of keyboard 420a may be used. It will also be appreciated that the mobile devices 100 shown in FIGS. 5 and 6 are for illustrative purposes only and various other mobile devices 100 are equally applicable to the following examples. Other buttons may also be disposed on the mobile device housing such as colour coded "Answer" and "Ignore" buttons to be used in telephonic communications.

A front view of an example of the mobile device 100b is shown in FIG. 6. The mobile device 100b includes a housing 502 that encloses components such as shown in FIG. 4. The housing 502 may include a back, sidewalls, and a front 504 that frames the touch-sensitive display 102. The example mobile device 100b shown in FIG. 6 can represent a portable tablet computer or other handheld or otherwise portable device.

In the example of FIG. 6, the touch-sensitive display 102 is generally centered in the housing 502 such that a display area 506 of the touch-sensitive overlay 364 is generally centered with respect to the front 504 of the housing 502. The non-display area 508 of the touch-sensitive overlay 364 extends around the display area 506. In the presently described example, the width of the non-display area is 4 mm. In one example, the touch-sensitive display area 122 and the touch-sensitive non-display area 124 of FIGS. 1A and 1B can be implemented as a display area 506 of the touch-sensitive overlay 364 and a non-display area 508 of the touch-sensitive overlay 364, respectively.

For the purpose of the present example, the touch-sensitive overlay 364 extends to cover the display area 506 and the non-display area 508. Touches on the display area 506 may be detected and, for example, may be associated with displayed selectable features. Touches on the non-display area 508 may be detected, for example, to detect a meta-navigation gesture. Alternatively, meta-navigation gestures may be determined by both the non-display area 508 and the display area 506. The density of touch sensors may differ from the display area 506 to the non-display area 508. For example, the density of nodes in a mutual capacitive touch-sensitive display, or density of locations at which electrodes of one layer cross over electrodes of another layer, may differ between the display area 506 and the non-display area 508.

Gestures received on the touch-sensitive display 102 may be analyzed based on the attributes to discriminate between meta-navigation gestures and other touches, or non-meta navigation gestures. Meta-navigation gestures may be identified when the gesture crosses over a boundary near a periphery of the display 362, such as a boundary 510 between the display area 506 and the non-display area 508. In the example of FIG. 6, the origin point of a meta-navigation gesture may be determined utilizing the area of the touch-sensitive overlay 364 that covers the non-display area 508.

A buffer region 512 or band that extends around the boundary 510 between the display area 506 and the non-display area 508 may be utilized such that a meta-navigation gesture is identified when a touch has an origin point outside the boundary 510 and the buffer region 512 and crosses through the buffer region 512 and over the boundary 510 to a point inside the boundary 510. Although illustrated in FIG. 6, the buffer region 512 may not be visible. Instead, the buffer region 512 may be a region around the boundary 510 that extends a width that is equivalent to a predetermined number of pixels, for example. Alternatively, the boundary 510 may extend a predetermined number of touch sensors or may extend a predetermined distance from the display area 506. The boundary 510 may be a touch-sensitive region or may be a region in which touches are not detected.

Gestures that have an origin point in the buffer region 512, for example, may be identified as non-meta navigation gestures. Optionally, data from such gestures may be utilized by an application as a non-meta navigation gesture. Alternatively, data from such gestures may be discarded such that touches that have an origin point on the buffer region 512 are not utilized as input at the mobile device 100.

Figure 7:
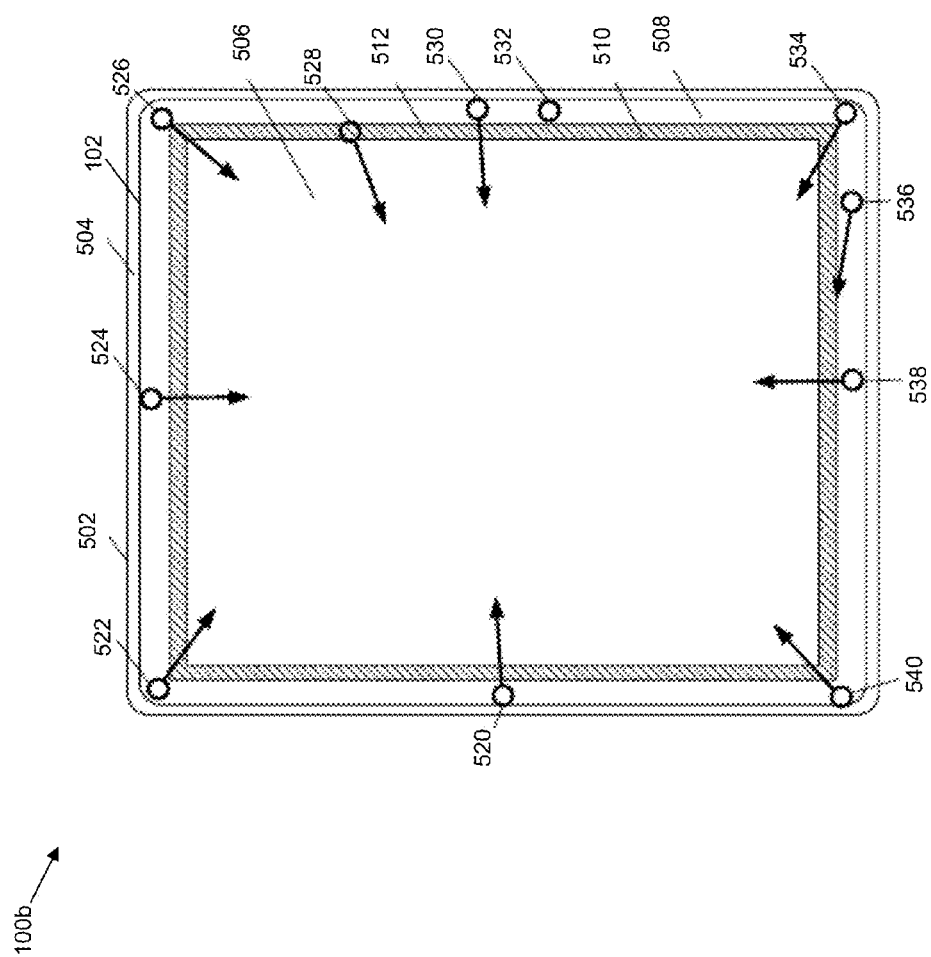
FIG. 7 is a plan view of example gestures on the mobile device of FIG. 6.

FIG. 7 illustrates examples of touches on the touch-sensitive display 102. The buffer region 512 is illustrated in FIG. 7 by hash markings for the purpose of explanation. As indicated, the buffer region 512 may not be visible to the user. For the purpose of explanation, touches are illustrated by circles at their points of origin. Arrows extending from the circles illustrate the paths of the touches that are gestures.

The touch 538 begins at the origin point outside the boundary 510 and outside the buffer region 512. The path of the touch 538 crosses the buffer region 512 and the boundary 510 and is therefore identified as a meta-navigation gesture. Similarly, the touches 520, 530, 524, 522, 526, 540, 534 each have origin points outside the boundary 510 and the buffer region 512 and their paths cross the buffer region 512 and the boundary 510. Each of the touches 520, 530, 524, 522, 526, 540, 534 is therefore identified as a meta-navigation gesture. The touch 528, however, has an origin point that falls within the buffer region 512 and the touch 528 is therefore not identified as a meta-navigation gesture. The touch 536 begins at an origin point outside the boundary 510 and the buffer region 512. The path of the touch 536, however, does not cross the boundary 510 and is therefore not identified as a meta-navigation gesture. The touch 532 also has an origin point outside the boundary 510 and the buffer region 512 but is not a gesture and therefore does not cross the boundary 510 and is not identified as a meta-navigation gesture.

Figure 8:
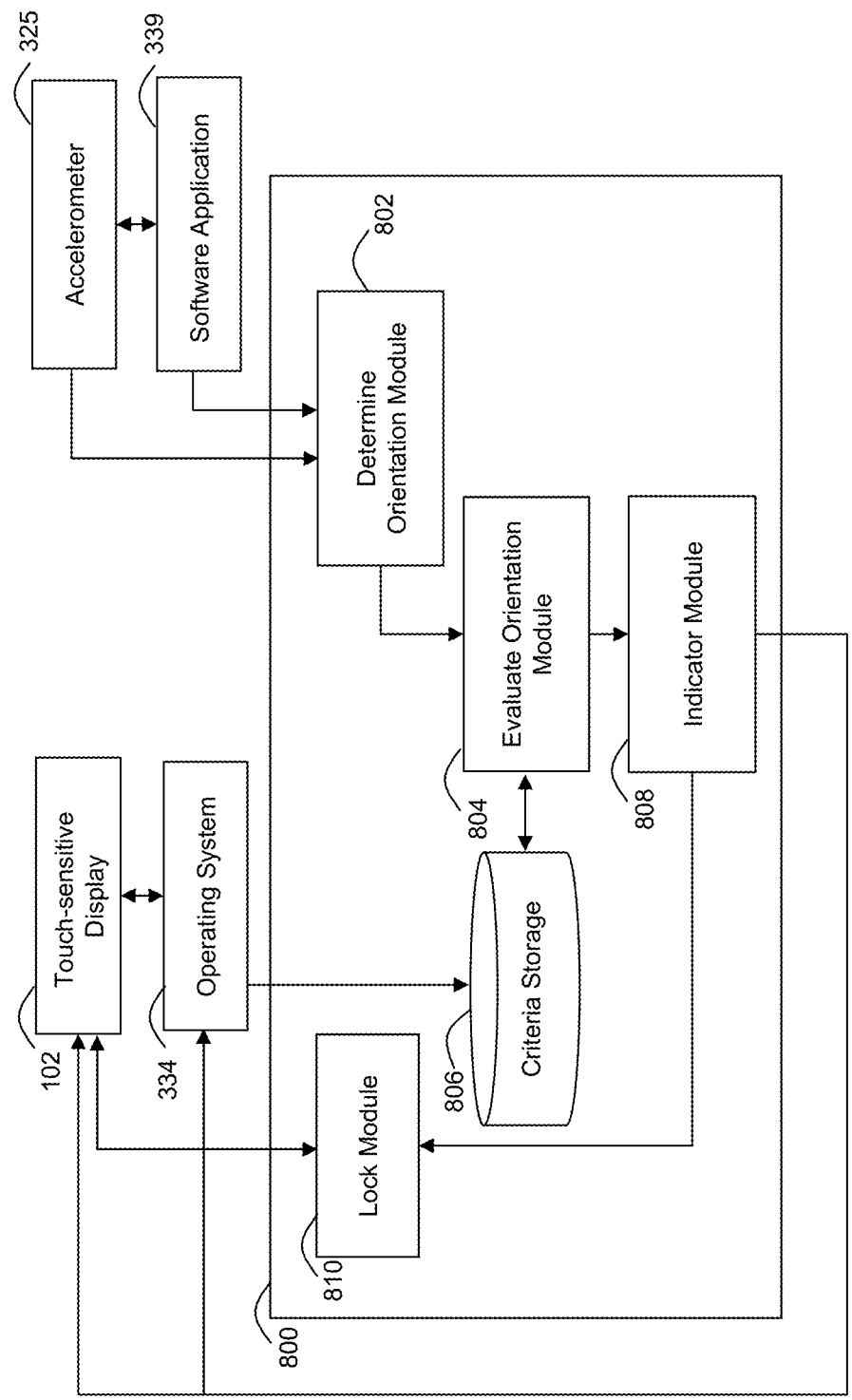
FIG. 8 is a diagram of an example configuration of a display orientation application.

Referring to FIG. 8, an example of a configuration for a display orientation application 800 is provided. The display orientation application 800 can be one of the other software applications 339 of FIG. 4 that can be loaded on the mobile device 100. The display orientation application 800 can request details of activity occurring in, or receive inputs from, a component that can be used to determine the orientation of the mobile device 100, such as a reading from one or more sensors of the mobile device 100 (e.g. accelerometer reading), or a software application 339 that provides that orientation of the mobile device (e.g. in the form of an orientation matrix). The display orientation application 800 can also request or receive information regarding the criteria used for changing the display orientation from other components that can change the display orientation, such as the operating system 334. The display orientation application 800 can also receive inputs from other components that can be used to determine properties of the display of the mobile device 100, such as the touch-sensitive display 102 and operating system 334. The display orientation application 800 can also receive input selections from one or more input mechanisms of the mobile device 100, such as touch gestures from the touch-sensitive display 102. Based on the orientation of the mobile device 100 and the criteria for changing the display orientation, the display orientation application 800 can provide an indicator of a proximity of the orientation of the mobile device 100 to satisfying the criteria associated with changing the display orientation. For example, the display orientation application 800 can instruct or otherwise cause the touch-sensitive display 102 to display an indicator 106.

The display orientation application 800 in the example of FIG. 8 includes a determine orientation module 802 for determining an orientation of the mobile device 100. The display orientation application 800 also includes an evaluate orientation module 804 for evaluating one or more properties of the orientation of the mobile device 100 based on one or more criteria stored in the criteria storage 806. The display orientation application 800 also includes a indicator module 808 for providing an indicator that the orientation of the mobile device 100 is approaching the criteria that can trigger a change in the display orientation. The display orientation application 800 can also include a lock module 810 for locking the display orientation of the touch-sensitive display 102.

The determine orientation module 802 determines a current orientation of the mobile device 100. In an example, the determine orientation module 802 can determine the orientation of the mobile device 100 from information provided by other components, such as comparing an accelerometer reading of the gravity reference direction 104 to the frame of reference of the mobile device 100 (eg. x and y axes of FIGS. 1A and 1B). In another example, the determine orientation module 802 can obtain the orientation from a component that has determined the orientation of the mobile device 100, such as a software application 339 that generates an orientation matrix. The orientation matrix may be generated from the magnetic north and gravity reference directions obtained from a magnetometer 327 and an accelerometer 325, respectively, or from other methods or techniques available on the mobile device 100.

The evaluate orientation module 804 receives the orientation of the mobile device 100 from the determine orientation module 802 and evaluates one or more properties of the orientation of the mobile device 100. The evaluate orientation module 804 determines whether the orientation of the mobile device satisfies one or more criteria stored in the criteria storage 806 and if not satisfied, determines a proximity or degree of how close the orientation of the mobile device 100 is to satisfying the one or more criteria. Referring back to the example of FIGS. 1A and 1B, the criteria may be that the angle $\theta$ is equal to a predetermined value (e.g. 30 degrees). The evaluate orientation module 804 can determine the difference between the angle $\theta$ of the current orientation of the mobile device 100 and the predetermined value, the difference being the proximity of the orientation of the mobile device 100 to satisfying the criteria. In another example, the evaluate orientation module 804 can also store previous orientations of the mobile device 100 to track the movement of the mobile device 100 and to determine whether the angle $\theta$ is decreasing towards 30 degrees. It will be appreciated that the evaluate orientation module 804 can evaluate one or more properties associated with the orientation of the mobile device 100 including its orientation with respect to a reference direction or a particular frame of reference, or a change in orientation of the mobile device 100 over a particular time period.

The criteria storage 806 stores the criteria used to evaluate the orientation of the mobile device 100. In one example, the criteria storage 806 can be provided or obtained from one or more components that change the display orientation, such as the user interface subsystem of the operating system 334 or a software application 339 running on the mobile device 100. In another example, the criteria can be preloaded in the criteria storage 806.

The indicator module 808 determines whether an indicator 106 is provided to indicate that the orientation of the mobile device 100 is approaching the criteria that can trigger a change in the display orientation. In one example, an indicator 106 is provided when the proximity or degree of the orientation of the mobile device 100 to satisfying the one or more criteria is within a predetermined threshold. For the example in FIGS. 1A and 1B, an indicator 106 may be displayed on the touch-sensitive display 102 if the angle θ is within +/−25 degrees of 30 degrees. In another example, the indicator 106 may be permanently displayed on the touch-sensitive display 102 of the mobile device 100.

In an example embodiment, the display orientation application 800 can include a lock module 810 to lock the display orientation of the touch-sensitive display area 122 to the current display orientation. For example, the indicator module 808 can send the lock module 810 the inputs associated with the indicator 106. The lock module 810 can then request details of the activity in, or receive inputs from, an input mechanism of the mobile device 100, such as the touch-sensitive display 102, to determine if an input associated with the indicator 106 has been received. Upon detecting a input associated with the indicator 106, the lock module 810 can instruct or otherwise cause the display orientation of the touch-sensitive display area 122 to be locked to its current display orientation.

It will be appreciated that any module, subsystem or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 9:
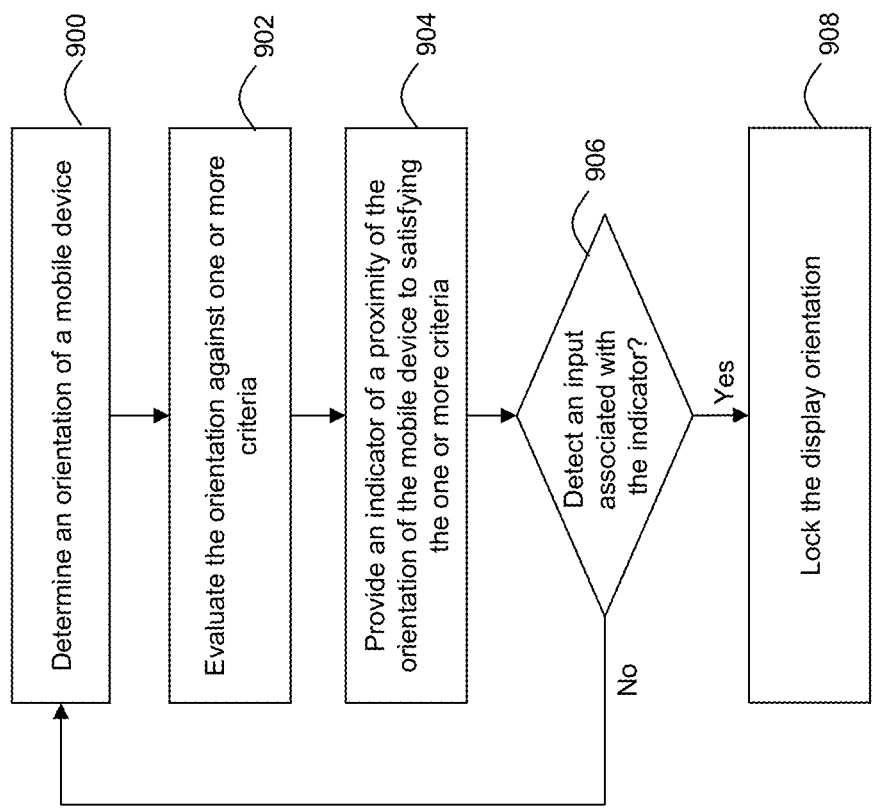
FIG. 9 is a flow diagram of example computer executable instructions for determining a display orientation of a mobile device.

Referring to FIG. 9, an example set of computer executable instructions is provided for determining a display orientation of an electronic device, such as a mobile device 100. At 900, an orientation of the mobile device 100 is determined. At 902, the orientation of the mobile device 100 is evaluated against one or more criteria associated with changing a display orientation of the mobile device 100. At 904, an indicator of a proximity of the orientation of the mobile device 100 to satisfying the one or more criteria is provided. In an example embodiment, the computer executable instructions can also include detecting an input associated with the indicator at 906, and locking the display orientation of the mobile device 100 at 908.

As noted above, at 900, an orientation of the mobile device 100 is determined. In an example configuration of the display orientation application 800, the determine orientation module 802 may implement 900 (FIG. 8). It will be appreciated that the orientation of the mobile device 100 can be determined from any method or technique available on the mobile device 100. In one example, the orientation of the mobile device 100 may be derived from one or more sensor readings (e.g. accelerometer reading to calculate angle θ). In another example, the orientation of the mobile device 100 may be obtained from an orientation matrix or other data describing the orientation of the mobile device 100. The orientation matrix may be generated from a combination of sensor readings, such as the magnetic north direction and the gravity reference direction 104, as obtained from a magnetometer 327 and accelerometer 325, respectively.

At 902, the orientation of the mobile device 100 is evaluated against one or more criteria associated with changing a display orientation of the mobile device 100. In an example configuration of the display orientation application 800, the evaluate orientation module 804 may implement 902 (FIG. 8). As illustrated in the example of FIGS. 1A and 1B, the criteria can include orienting the mobile device to a specific position with respect to a reference direction, such as an angle θ of 30 degrees with the gravity reference direction 104.

In another example, the criteria can also include a change in the orientation of the mobile device 100, such as requiring the mobile device 100 to be moving towards the criteria. Providing an indicator that the mobile device is moving towards the criteria that will change the display orientation can warn the user that the display orientation will change if the current path of the mobile device 100 is maintained. In the example of FIGS. 1A and 1B, the criteria to change the display orientation of the mobile device 100 can include changing the orientation of the mobile device 100 such that the angle θ is decreasing towards 30 degrees.

In another example, the criteria may also include the current display orientation of the mobile device 100. For example, when the touch-sensitive display 102 is configured to a portrait orientation (e.g. position A of FIG. 1A), the criteria may include that the angle θ equals 30 degrees to ensure that the display orientation changes only when the orientation of the mobile device 100 is close to a landscape orientation. When the touch-sensitive display 102 is configured to a landscape orientation (e.g. position D of FIG. 1B), the criteria may include that the angle θ equal 60 degrees to ensure that the display orientation changes only when the orientation of the mobile device 100 is close to a portrait orientation.

It will be appreciated that that other criteria can be used to trigger a change in the display orientation. In another example, the operating system 334 or other software application 339 controlling the graphical user interface may determine the criteria used to trigger a change in the display orientation.

At 904, an indicator of a proximity of the orientation of the mobile device 100 to satisfying the one or more criteria associated with changing the display orientation is provided. In an example configuration of the display orientation application 800, the indicator module 808 may implement 904 (FIG. 8). In the example of FIGS. 1A and 1B, the indicator 106 is only displayed when the orientation of the mobile device 100 is within a predetermined proximity of the one or more criteria so as to conserve display area for other content when the mobile device 100 is not close to changing the display orientation (e.g. positions A and D). In another example, the indicator 106 can be permanently displayed, and the content of the indicator 106 can indicate the proximity of the mobile device 100 to changing the display orientation.

FIG. 10 illustrates another example indicator 106' corresponding to the positions B and C of the mobile device 100 of FIGS. 1A and 1B. In this example, the indicator 106' comprises a portrait orientation indicator 1002 and a landscape orientation indicator 1000. The active display orientation is indicated by the bordered orientation indicator 1002 and 1000 for positions B and C, respectively. The next display orientation is indicated by the shaded orientation indicator 1000 and 1002 for positions B and C, respectively. At position B, the active display orientation is a portrait orientation such that the portrait orientation indicator 1002 is bordered while the landscape orientation indicator 1000 is shaded. As the orientation of the mobile device 100 moves from position B to position C, the indicator 106' can indicate an increased proximity to triggering a change in the display orientation by reducing the strength of the border of the portrait orientation indicator 1002 and increasing the strength of the shaded landscape orientation indicator 1000. Once the display orientation changes from portrait to landscape, the portrait orientation indicator 1002 can be shaded and the landscape orientation indicator 1000 can be bordered (position C). As the mobile device 100 moves away from position C to position D, the border of the landscape orientation indicator can be strengthened while the portrait orientation indicator 1002 shading can be weakened to indicate a decrease in proximity to triggering a subsequent change in display orientation.

Figure 11:
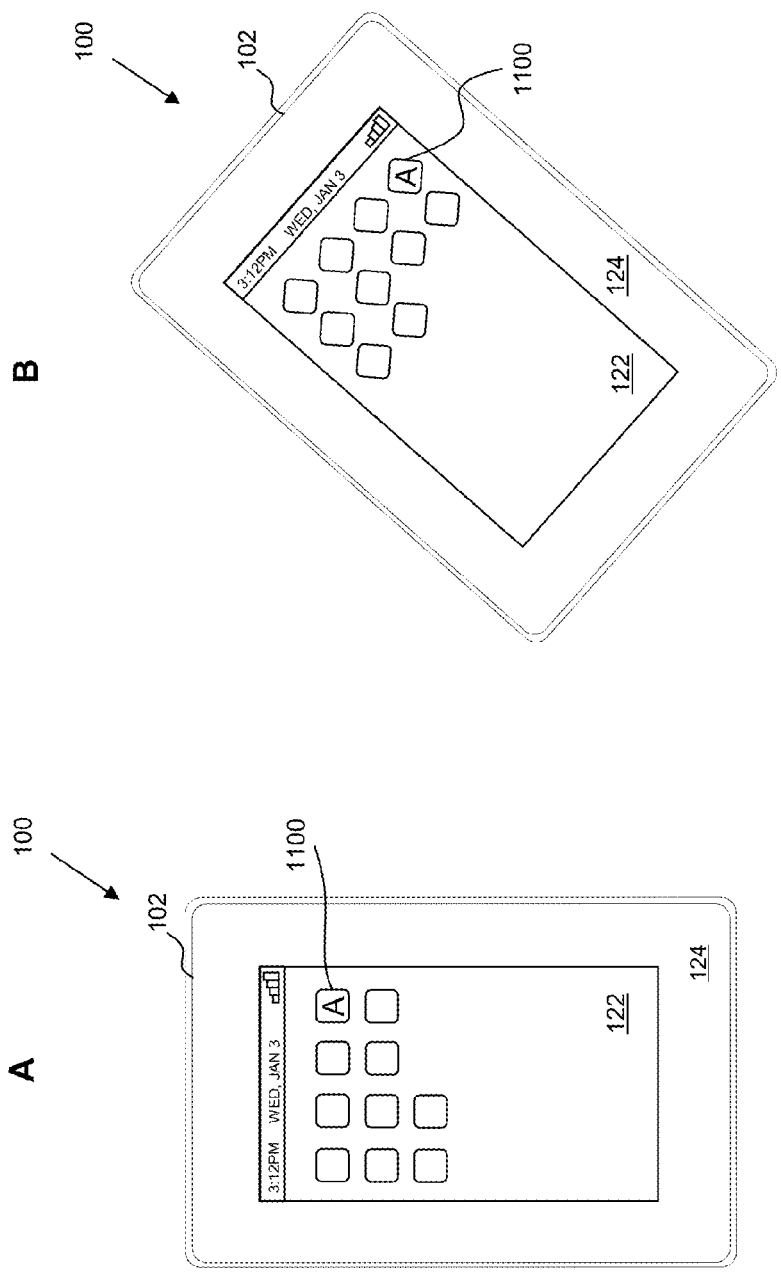
FIG. 11 is a plan view of another example of an indicator provided on a mobile device.

Referring to FIG. 11, another example indicator is illustrated. In FIG. 11, the touch-sensitive display area 122 of a mobile device 100 is displaying one or more items 1100, such as icons typically shown on a home screen. The mobile device 100 rotates clockwise from a portrait orientation at position A to position B. As the mobile device 100 moves towards a landscape orientation, one or more of the existing items displayed on the touch-sensitive display area 122 can change orientation. In an example, a clockwise rotation of the mobile device 100 can cause the one or more of the items 1100 to rotate counter clockwise. The degree of change in the orientation of items 1100 can be proportional to the proximity of the orientation of the mobile device 100 to satisfying the criteria associated with triggering a change in the display orientation.

It will be appreciated that the indicator can also take on various forms of notifications or alerts available on a mobile device 100, such as audio alerts, haptic alerts (e.g. a vibration), text prompts and other visual indicators (e.g. graphics, animations, icons, images, etc.).

Referring back to FIG. 9, in an example embodiment, at 906, an input associated with the indicator may be detected to lock the display orientation at 908. In an example configuration of the display orientation application 800, the lock module 810 may implement 906 and 908 (FIG. 8).

In an example, the indicator 106 or 106' displayed on the touch-sensitive display area 122 can be selectable by a user (e.g. by performing a tap gesture on the touch-sensitive display area 122 at the location of the indicator 106 or 106'). When the indicator 106 or 106' is selected, the display orientation can be locked in the current display orientation, irrespective of subsequent changes in the orientation of the mobile device 100. Selection of the indicator 106 or 106' can also cause the indicator to display a padlock or other visual indicator to indicate that the display orientation is locked. Subsequent selection of the indicator 106 or 106' can unlock the display orientation.

In another example, providing the indicator can enable the mobile device 100 to detect additional inputs associated with the indicator. For example, the mobile device 100 may be configured to associate a particular input, such as a gesture performed within the touch-sensitive non-display area 124, to lock the current display orientation when the indicator 160 or 160' is displayed on the mobile device 100. When the indicator 160 or 160' is not provided, a gesture performed on the touch-sensitive non-display area 124 may be used to perform other functions not related to the display orientation application 800.

Figure 12:
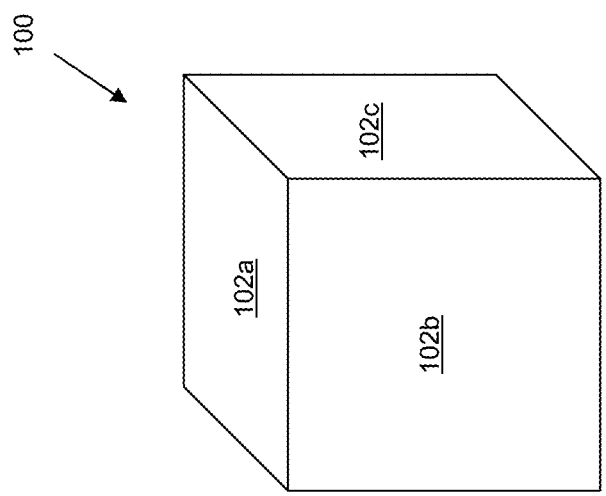
FIG. 12 is a perspective view of another example of a mobile device.

It will be appreciated that the mobile device 100 can take on a various shapes and form factors, including planar devices and other 3D shapes having a plurality of faces. The mobile device 100 may also include more than one display, such as a touch-sensitive display 102 located on one or more faces of the mobile device 100. In the example of FIG. 12, a mobile device 100 is shown having a cubic shape with a plurality of touch-sensitive displays 102a-102c. The display orientation of each touch-sensitive display 102a-102c can be controlled by its own display orientation application 800, a common display orientation application 800 or a combination thereof.

It will also be appreciated that the display of the mobile device 100, such as the touch-sensitive display 102, may also take on various shapes such as rectangular, hexagonal, circular, etc. The touch-sensitive display 102 may also include one or more faces that can be configured, positioned, retracted, folded, bent or otherwise manipulated into various shapes and orientations.

Figure 13:
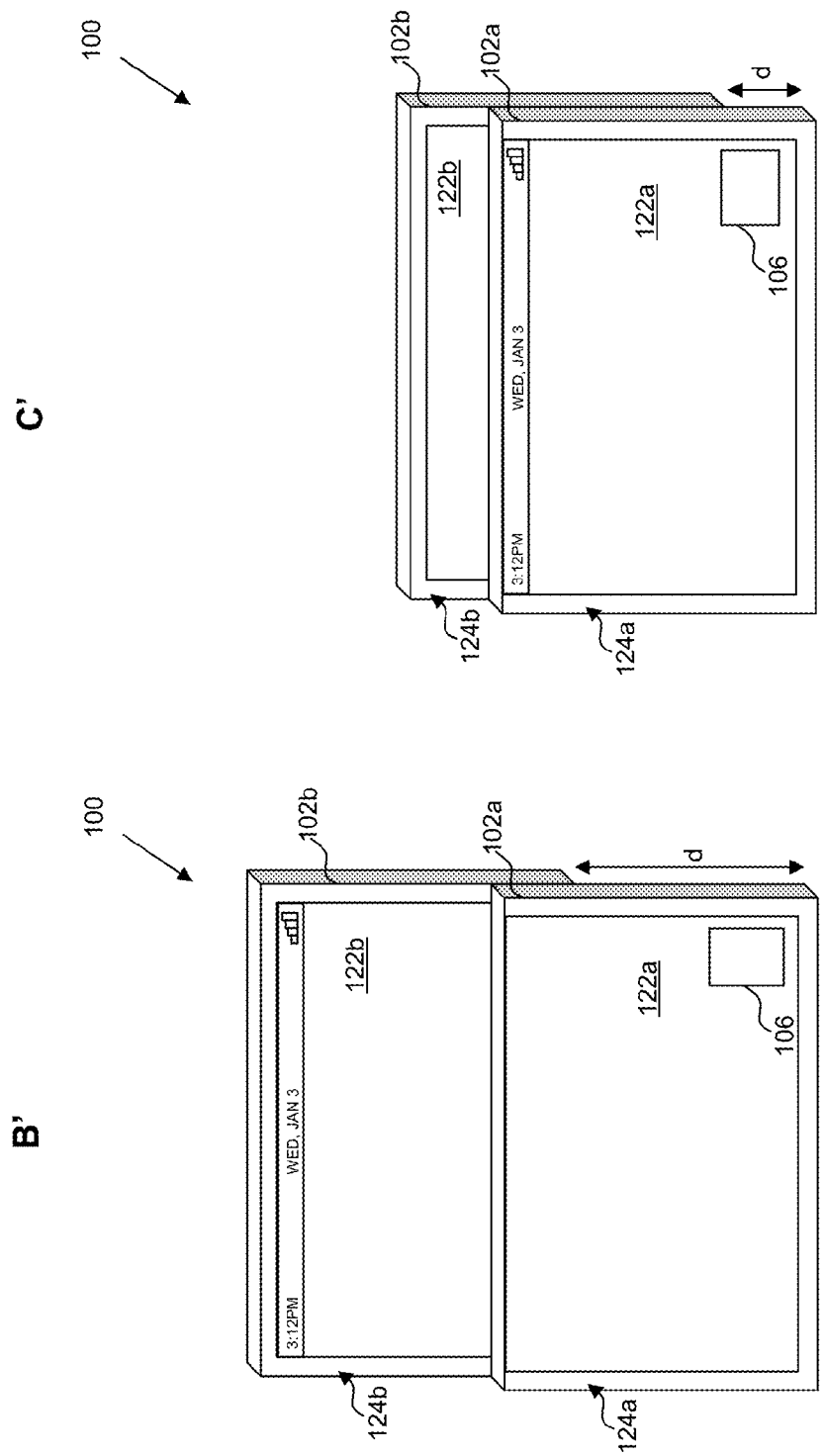
FIG. 13 is a perspective view of another example of a mobile device in different orientations.

In the example of FIG. 13, another mobile device 100 including a "slide-out" display is provided. The slide out display includes a touch-sensitive display 102b which can slide a distance d away from another touch-sensitive display 102a. At position B', the mobile device 100 is oriented such that the touch-sensitive display 102b is extended a distance d that is above a threshold value to activate the touch-sensitive display area 122b. The increased total viewable area of the touch-sensitive display areas 122a and 122b accommodates a portrait display orientation across the combined touch-sensitive display areas 122a and 122b. At position C', the mobile device 100 is oriented such that the touch-sensitive display 102b is retracted to a distance d below the threshold value to deactivate the touch-sensitive display area 122b, resulting in a landscape orientation of the touch-sensitive display area 122a.

In an example, an indicator 106 can be provided by the mobile device 100 to indicate a proximity of the distance d to the predetermined value used to trigger a change in the display orientation. The orientation of the mobile device 100, as defined by the distance d between the touch-sensitive displays 102a and 102b, can be determined by a linear potentiometer of the mobile device 100. It will be appreciated that the orientation of a mobile device 100 can be determined by a combination of sensors or other measurement devices (e.g. potentiometer) available on the mobile device 100.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A method of determining a display orientation of a mobile device, the mobile device configured to change the display orientation when an orientation of the mobile device satisfies one or more criteria for triggering a change in the display orientation, the method comprising:
  determining the orientation of the mobile device;
  determining a proximity of the orientation of the mobile device relative to satisfying one or more criteria that triggers a change in display orientation of a touchscreen display of the mobile device between portrait and landscape orientations; and
  providing a visual status indicator of a degree of change of proximity of the orientation of the mobile device relative to satisfying the one or more criteria that triggers a change in display orientation of a touchscreen display, the visual status indicator comprising a display orientation indicator having a border displayed on the touchscreen display based on
    the degree of change of proximity of the orientation of the mobile device relative to satisfying the one or more criteria, and
    the orientation of the mobile device being within a predetermined threshold of satisfying the one or more criteria; and
  displaying the border of the display orientation indicator as a stronger border of the display orientation indicator while the current orientation of the mobile device is outside of a predetermined threshold of satisfying the one or more criteria that can trigger a change in display orientation; and
  displaying the border of the display orientation indicator as a weaker border of the display orientation indicator while the current orientation of the mobile device is within a predetermined threshold of satisfying the one or more criteria that can trigger a change in display orientation between portrait and landscape orientations to notify a user that the orientation of the mobile device is approaching an orientation that will cause a change in display orientation and to provide an opportunity for the user to determine whether to continue a motion to trigger the change in display orientation.

2. The method of claim 1, further comprising:
  detecting a user input on the visual indicator displayed on the touchscreen display; and
  locking the display orientation based on detecting the user input.

3. The method of claim 1 further comprising, prior to providing the visual status indicator, determining that the orientation of the mobile device is within a predetermined threshold of the one or more criteria.

4. The method of claim 1, wherein the visual status indicator comprises any one or more of: an animation, icon, image and text.

5. The method of claim 1, further comprising:
  determining a proximity of the orientation of the mobile device relative to satisfying the one or more criteria for triggering a change in display orientation of the touchscreen display of the mobile device by determining a difference between an angle of a current orientation of the mobile device and a predetermined value of angle of orientation of the mobile device at which is triggered a change in display orientation of the touchscreen display of the mobile device.

6. The method of claim 1, wherein the one or more criteria comprises orientating the mobile device to a specific position relative to a reference direction.

7. The method of claim 1, wherein the one or more criteria comprises a change in the orientation of the mobile device towards the one or more criteria.

8. The method of claim 1, wherein the visual status indicator further comprising a device orientation indicator displayed on the touchscreen display to indicate the orientation of the mobile device with respect to a fixed frame of reference.

9. The method of claim 1, wherein the display orientation indicator is only a border displayed on the touchscreen display.

10. A computer readable storage medium for determining a display orientation of a mobile device, the mobile device configured to change the display orientation when an orientation of the mobile device satisfies one or more criteria for triggering a change in the display orientation, the computer readable storage medium comprising computer executable instructions which, responsive to being executed by a processor, cause the processor to perform operations comprising:
  determining the orientation of the mobile device;
  determining a proximity of the orientation of the mobile device relative to satisfying one or more criteria that triggers a change in display orientation of a touchscreen display of the mobile device between portrait and landscape orientations; and
  providing a visual status indicator of a degree of change of proximity of the orientation of the mobile device relative to satisfying the one or more criteria that triggers a change in display orientation of a touchscreen display, the visual status indicator comprising a display orientation indicator having a border displayed on the touchscreen display based on
    the degree of change of proximity of the orientation of the mobile device relative to satisfying the one or more criteria, and
    the orientation of the mobile device being within a predetermined threshold of satisfying the one or more criteria; and
  displaying the border of the display orientation indicator as a stronger border of the display orientation indicator while the current orientation of the mobile device is outside of a predetermined threshold of satisfying the one or more criteria that can trigger a change in display orientation; and
    displaying the border of the display orientation indicator as a weaker border of the display orientation indicator while the current orientation of the mobile device is within a predetermined threshold of satisfying the one or more criteria that can trigger a change in display orientation between portrait and landscape orientations to notify a user that the orientation of the mobile device is approaching an orientation that will cause a change in display orientation and to provide an opportunity for the user to determine whether to continue a motion to trigger the change in display orientation.

11. The computer readable medium of claim 10 further comprising computer executable instructions for causing the processor to perform operations comprising:
  detecting a user input on the visual indicator displayed on the touchscreen display; and locking the display orientation based on detecting the user input.

12. The computer readable medium of claim 10 further comprising computer executable instructions for causing the processor to perform operations comprising, prior to providing the visual status indicator, determining that the orientation of the mobile device is within a predetermined threshold of the one or more criteria.

13. The computer readable medium of claim 10, wherein the visual status indicator comprises any one or more of: an animation, icon, image and text.

14. The computer readable medium of claim 10, further comprising computer executable instructions for causing the processor to perform operations comprising:
    determining a proximity of the orientation of the mobile device relative to satisfying one or more criteria for triggering a change in display orientation of the touchscreen display of the mobile device by determining a difference between an angle of a current orientation of the mobile device and a predetermined value of angle of orientation of the mobile device at which is triggered a change in display orientation of the touchscreen display of the mobile device.

15. A mobile device comprising a processor and memory, the mobile device configured to change a display orientation when an orientation of the mobile device satisfies one or more criteria for triggering a change in the display orientation, the memory storing computer executable instructions for causing the processor to perform operations comprising:
    determining the orientation of the mobile device;
    determining a proximity of the orientation of the mobile device relative to satisfying one or more criteria that triggers a change in display orientation of a touchscreen display of the mobile device between portrait and landscape orientations; and
    providing a visual status indicator of a degree of change of proximity of the orientation of the mobile device relative to satisfying the one or more criteria that triggers a change in display orientation of a touchscreen display, the visual status indicator comprising a display orientation indicator having a border displayed on the touchscreen display based on
        the degree of change of proximity of the orientation of the mobile device relative to satisfying the one or more criteria, and
        the orientation of the mobile device being within a predetermined threshold of satisfying the one or more criteria; and
    displaying the border of the display orientation indicator as a stronger border of the display orientation indicator while the current orientation of the mobile device is outside of a predetermined threshold of satisfying the one or more criteria that can trigger a change in display orientation; and
    displaying the border of the display orientation indicator as a weaker border of the display orientation indicator while the current orientation of the mobile device is within a predetermined threshold of satisfying the one or more criteria that can trigger a change in display orientation between portrait and landscape orientations to notify a user that the orientation of the mobile device is approaching an orientation that will cause a change in display orientation and to provide an opportunity for the user to determine whether to continue a motion to trigger the change in display orientation.

16. The mobile device of claim 15, wherein the memory further stores computer executable instructions for causing the processor to perform operations comprising:
    detecting a user input on the visual indicator displayed on the touchscreen display; and
    locking the display orientation based on detecting the user input.

17. The mobile device of claim 15, wherein the memory further stores computer executable instructions for causing the processor to perform operations comprising, prior to providing the visual status indicator, determining that the orientation of the mobile device is within a predetermined threshold relative to satisfying the one or more criteria.

18. The mobile device of claim 15, wherein the memory further stores computer executable instructions for causing the processor to perform operations comprising:
    determining a proximity of the orientation of the mobile device relative to satisfying one or more criteria for triggering a change in display orientation of the touchscreen display of the mobile device by determining a difference between an angle of a current orientation of the mobile device and a predetermined value of angle of orientation of the mobile device at which is triggered a change in display orientation of the touchscreen display of the mobile device.

* * * * *